United States Patent [19]

Stanfield

[11] Patent Number: 4,986,793

[45] Date of Patent: Jan. 22, 1991

[54] SEED CORN SHELLER

[76] Inventor: Zenas A. Stanfield, 106 S. Vale St., Bloomington, Ill. 61701

[21] Appl. No.: 295,280

[22] Filed: Jan. 10, 1989

[51] Int. Cl.$^5$ .............................................. A01F 11/06
[52] U.S. Cl. ...................................................... 460/47
[58] Field of Search .......................... 130/6, 7, 8, 9 R; 460/47, 45; 99/574

[56] References Cited

U.S. PATENT DOCUMENTS

| | | | |
|---|---|---|---|
| 150,365 | 4/1874 | Sherwood | 460/47 |
| 228,340 | 6/1880 | Gathmann | 130/7 |
| 732,217 | 6/1903 | Patch | 130/7 |
| 1,015,346 | 1/1912 | Rushing et al. | 130/7 |
| 1,016,471 | 2/1912 | Bozile | 130/7 |
| 2,443,031 | 6/1948 | Gerber | 130/6 |
| 3,844,293 | 10/1974 | Young | 130/6 |
| 4,532,940 | 8/1985 | Mitkov | 460/46 X |

Primary Examiner—Stephen J. Novosad
Attorney, Agent, or Firm—Berman, Aisenberg & Platt

[57] ABSTRACT

A seed corn sheller has a fixed disk for receiving corn through a central aperture thereof, spaced away from a rotating disk. The disks are faced with a contoured material which is soft but abrading. Corn cobs are fed between the disks and move to the perimeter thereof while being shelled. Corn and cobs are discharged separately from the apparatus.

6 Claims, 1 Drawing Sheet

SEED CORN SHELLER

FIELD OF THE INVENTION

The invention relates to apparatus for separating corn kernels from corn cobs.

BACKGROUND OF THE INVENTION

Known seed corn shellers either do not provide a good yield of corn or else, if overly abrasive, damage the seed corn during removal from the cob. Known patents relating to similar subject matter include Sherwood, U.S. Pat. No. 150,365, Bozile, U.S. Pat. No. 1,016,471, Rushing, U.S. Pat. No. 1,015,346, Gerber, U.S. Pat. No. 2,443,031, and Mitkov, U.S. Pat. No. 4,532,940. None of these patents discloses a seed hopper in which the corn is fed into the central portion of a fixed disk spaced from a rotatable disk.

SUMMARY OF THE INVENTION

The seed corn sheller of the invention includes a stationary disk spaced apart from a rotating disk which abrades the corn cobs against the stationary disk. Corn cobs are fed to a hopper and enter the space between the disks at the center of the stationary disk. As the corn is removed from the cob, the cob moves toward the outer circumference of the disks and is discharged into a perforated pan conveyor. Kernels removed from the cob fall by gravity to a pan conveyor which removes the kernels from the apparatus.

DETAILED DESCRIPTION OF THE INVENTION

The seed corn sheller of the invention provides an apparatus for shelling corn kernels having a moisture content of up to 18–20% and higher.

Figure 1:
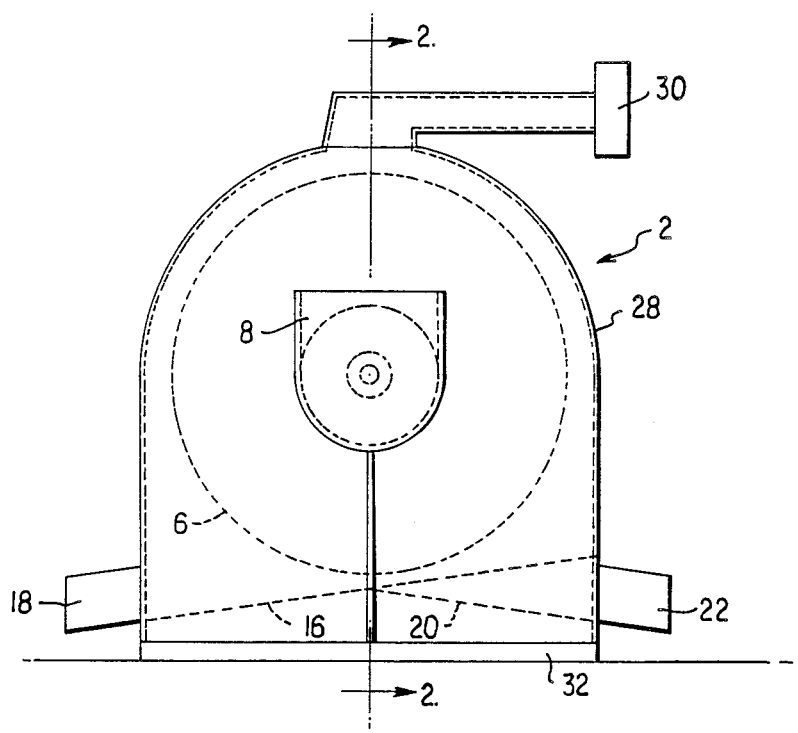
FIG. 1 is a side elevation of apparatus of the invention.
Figure 2:
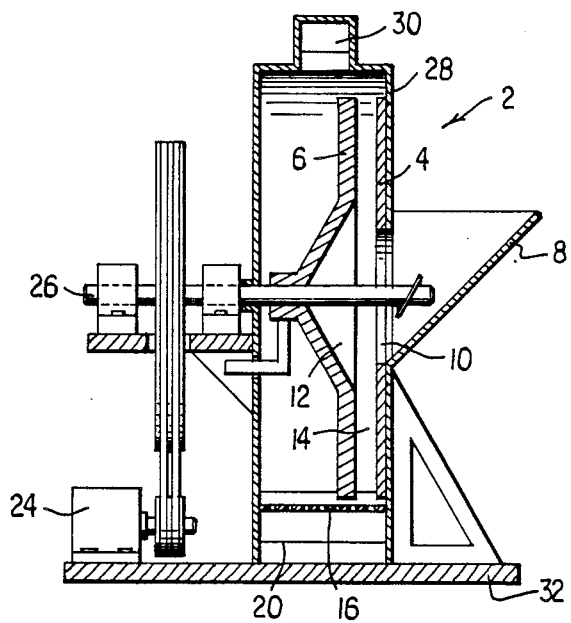
FIG. 2 is a cross-sectional view taken on line 2—2 of FIG. 1.

Referring now to FIGS. 1 and 2 in which like numerals represent like parts, apparatus 2 is a seed corn sheller of the invention in which stationary disk 4 is spaced apart from rotating disk 6. Disk 6 may be positioned on shaft 26 to change space 14 to fit cob diameter. Disks 4 and 6 are of substantially the same diameter. Ears of corn are fed to hopper 8 and the ears enter the space between stationary disk 4 and rotating disk 6 through aperture 10 in the center of stationary disk 4. The ears of corn enter space 12 and, due to the rotating motion of disk 6, the ears of corn enter space 14 where they are held between the two disks and rotated. The ears follow a spiral path between the disks from the central opening around the disks and outwardly to the circumference. As the kernels are removed from the corn cobs, the cobs move to the outer circumference between disks 4 and 6 and are discharged from the perimeter of the disks. The cobs drop to a perforated pan conveyor 16, which may be a vibrating conveyor, and leave the apparatus at exit 18. Corn kernels drop through perforated pan conveyor 16 onto solid pan conveyor 20 and leave the apparatus at exit 22.

Motor 24 drives shaft 26 on which rotating disk 6 is mounted.

The apparatus is enclosed in housing 28 for collecting the corn and the cobs being discharged from the circumference of the disks and for serving as a duct for collection of dust and waste tissues released during the process of separation of the kernels from the cobs. Dust fan 30 pulls air through housing 28 into a remote collection device. The device may be supported on a base 32.

The action of the rotating disk against the stationary disk simulates the process of manual shelling of ears of corn. In manual shelling, the sheller grasps an ear of corn and twists or turns it while it is being grasped. This dual action removes the kernels in a gentle manner without causing cracks or bruises on the surface of the kernels. The grasping, turning action is simulated by the ears of corn being held between the disks and rotated. The interior facing surfaces of disks 4 and 6 are covered with material having contours, for example, linear hills and valleys. The contoured surfacing material is of selected hardness and durability so as to avoid damaging the kernel and so as to be relatively long lasting. Ribbed polyurethane is a suitable disk lining material since it is soft but abrasion resistant. This soft material may be applied to the facing surfaces of the disks using adhesive, fasteners or other appropriate means. Other suitable surfacing materials include other plastic materials or ribbed rubber floor matting having straight line or curved line ribs. Many patterns of surface contour are suitable except contoured circles concentric with the disks which carry the ears of corn around the disks without removing the kernels from the cobs and without discharging the cobs and corn from the perimeter of the disks. The height of the "hills" may be, in non-limiting example, one-quarter to one-half inch and the width of the valleys may be, in non-limiting example, one-quarter to one-half inch.

The two disks are of substantially equal diameter and are spaced away from each other a distance which may be varied to achieve maximum quality and quantity of yield. The substantially parallel disks may be mounted at any appropriate angle to the ground while maintaining the spacing and orientation of each disk to the other.

In a typical example, a 1½ horsepower motor is used to rotate the shaft at 30 revolutions per minute. Using a feed rate of 1200 ears of corn per minute, the feed inlet has a diameter of about 3 feet and the disk diameter is about 6 feet.

In contrast, a typical known commercial sheller having the same feed capacity uses a 28 horsepower motor at 300 revolutions per minute, without achieving an equivalent quality of shelling efficiency.

A rotating disk having a 3 foot diameter entrance aperture has a surface speed of about 300 feet per minute. This is approximately the maximum surface speed for a corn cob entering the feed circle for any size of disk. Impact damage on the kernels begins to appear at and above the range 350 to 500 feet per minute. Kernels in the outer 12 inches of the disks move faster as the surface speed increases outwardly from the center. This increase in speed as the corn cob passes over the hills and valleys provides the twisting force to the ear of corn which pops the kernels loose from the cobs. The speed is not related to the space between the disks which may be adjusted according to the type of corn being shelled.

The diameter of mature corn cobs is substantially uniform for a specific hybrid or genotype of corn. Only one type of hybrid is shelled at a time, and thus, size separation is not necessary before shelling. The stationary disk has means for being moved on the shaft to set a fixed distance between the perimeters of disks of approximately the diameter of the cob for the hybrid being shelled. It is not necessary to recycle the cobs since efficient shelling is achieved using this corn sheller. The speed of rotation is selected for each type or hybrid of corn so that unshelled cobs are not produced. All cobs are discharged from the perimeter of the disks.

The sheller can be produced in a range of capacities from laboratory models to large capacity commercial models without deterioration of quality. Seed damage in shelling is avoided. The apparatus has low energy usage compared with a typical commercial sheller, since it uses a smaller motor, and is self-cleaning. The machine is simple and economical to manufacture.

A further significant advantage is that corn can be shelled without predrying. Current usual practice is to pick seed corn on the ear at a moisture content generally above 30%, remove the husks, sort out the undesirable ears of corn, and dry the remainder of the ears of corn in a drier to reduce the moisture content to 12% before shelling. Storing seed corn at moisture content above about 12% results in deterioration of seed quality and shelling corn of moisture content much above 12% results in seed damage when traditional apparatus is used. Using the seed corn sheller of the invention, ears of corn may be shelled immediately after sorting so that the ears of corn need not be dried before shelling. Kernels alone may be dried after shelling. Drying time and energy consumption are both substantially reduced. Test results show that corn kernels having a moisture content of up to 18-20% and higher may be shelled at a quality and efficiency similar to hand shelling, but at far greater speed without kernel damage.

While the invention has been described above with respect to certain embodiments thereof, it will be appreciated that variations and modifications may be made without departing from the spirit and scope of the invention.

What is claimed is:

1. A seed corn sheller comprising:
   fixed plate means for receiving ears of corn through a substantially central portion thereof;
   rotating plate means spaced from said fixed plate means for holding and removing kernels from the ears of corn against said fixed plate means, said rotating plate means comprising conical means in a central portion thereof for receiving said ears of corn; and
   feeding means for adding ears of corn between said fixed plate means and said rotating plate means through the substantially central portion of said fixed plate means into said conical means.

2. A seed corn sheller of claim 1 wherein each at least one plate means further comprises surface means affixed to facing surfaces of each of said plate means for separating kernels from the ears of corn.

3. A seed corn sheller of comprising:
   fixed plate means for receiving ears of corn through a substantially central portion thereof;
   rotating plate means spaced from said fixed plate means for holding and removing kernels from the ears of corn against said fixed plate means; and
   feeding means for adding ears of corn between said fixed plate means and said rotating plate means through the substantially central portion of said fixed plate means; wherein each plate means further comprises surface means affixed to facing surfaces of each of said plate means for separating kernels from the ears of corn, and
   wherein the surface means comprises polyurethane.

4. A seed corn sheller of claim 3 wherein the surface means comprises ribbed polyurethane.

5. A seed corn sheller of claim 1 wherein both plate means are substantially parallel to each other regardless of orientation to the horizontal.

6. A seed corn sheller of claim 1 further comprising means for separating shelled corn from corn cobs discharged from between the fixed and rotating plate means.

* * * * *